United States Patent [19]
Frossard

[11] 3,878,774
[45] Apr. 22, 1975

[54] PLANT FOR COMPACTING AND CRUSHING DOMESTIC RUBBISH

[76] Inventor: Joseph Frossard, 10-12 rue du Commandant Marchand, Paris, France

[22] Filed: June 9, 1972

[21] Appl. No.: 261,468

[30] Foreign Application Priority Data
June 9, 1971 France .............................. 71.21755
Sept. 16, 1971 France .............................. 71.34162

[52] U.S. Cl. .................. 100/96; 100/193; 100/215; 100/229 A; 141/248
[51] Int. Cl. ............................................ B30b 15/30
[58] Field of Search ......... 100/209, 215, 95, 96, 97, 100/229 A, 186, 193, 208; 141/248; 198/59

[56] References Cited
UNITED STATES PATENTS
208,723  10/1878  Eason ................................... 100/97
1,065,754  6/1913  Wilkerson ........................... 141/248
2,796,089  6/1957  Goetz ................................. 141/248 X
3,029,924  4/1962  Musschoot ........................... 198/59
3,171,447  3/1965  Fowler et al. .................... 141/248 X
3,288,177  11/1966  Clark .............................. 100/215 X
3,357,380  12/1967  Siracusa ......................... 100/97 UX
3,695,175  10/1972  Bausenbach ....................... 100/193

Primary Examiner—Billy J. Wilhite
Attorney, Agent, or Firm—Sughrue, Rothwell, Mion, Zinn & Macpeak

[57] ABSTRACT

The rubbish is transferred from a receiving tank to a double hopper provided with a distributing gate whereby the rubbish may be alternately directed toward one of two outlet spouts each of which leads to a compacting device.

2 Claims, 3 Drawing Figures

PLANT FOR COMPACTING AND CRUSHING DOMESTIC RUBBISH

The present invention relates to a plant of a novel type for compacting and crushing domestic rubbish.

It is known to install a plant where the collecting trucks dump the domestic rubbish into a huge pit. The rubbish is taken from the pit by the bucket of a drag line, which dumps it into the bin of a compacting device. The latter includes a horizontal pusher which pushed the rubbish into a container. When the latter is full of compacted rubbish, it is closed and removed from the compacting device, and then loaded onto a truck and brought to an incinerator or spread out on manure fields.

Such a plant has a drawback, in that it is necessary to operate the feed systems of the compactor in a discontinuous way, owing to the fact that the feed must be stopped during the positioning of a new container, or the removal of a container just filled.

The object of the present invention is to obviate such a drawback by providing a plant for rubbish wherein the feed devices operate in a continuous way.

A plant for rubbish according to the invention includes a tank which receives the rubbish to direct same towards treating and compacting devices for putting domestic rubbish into containers, and it is characterized in that the rubbish from the tank falls into a double hopper provided with a distributing gate which makes it possible for the rubbish to be directed alternately towards either one of the outlet spouts of said double hopper, each said spout providing the feed to a compacting device adapted to compress the rubbish in a container.

It is thus possible to replace a full container by an empty one on the first compacting device while another container is being filled by the second compacting device, and the vice versa.

According to another feature of the invention, the distributing gate is constituted by a swinging flap, the lower part of which carries a transverse swinging shaft, said flap being interposed at the point of junction of the receptacle and the two spouts of the double hopper, said double hopper having an inverted Y section.

According to another feature of the invention, the transverse shaft driving the distributing gate is integral with the flap, and its end projecting outside the double hopper is actuated by a double-acting hydraulic jack.

According to a further feature of the invention, a crusher is interposed between the feed chamber and the double hopper, so that it is possible to treat the rubbish before compacting same. Experience shows that such a treatment ensures a quick fermentation of the rubbish spread onto manure fields. It will thus be seen that the plant according to the invention not only aims at covering the transport charges, but ensures actually an effective treatment of the domestic rubbish.

The drawing appended hereto, and given by way of a nonlimiting example, will bring out the features of the invention. In the drawing.

Figure 1:
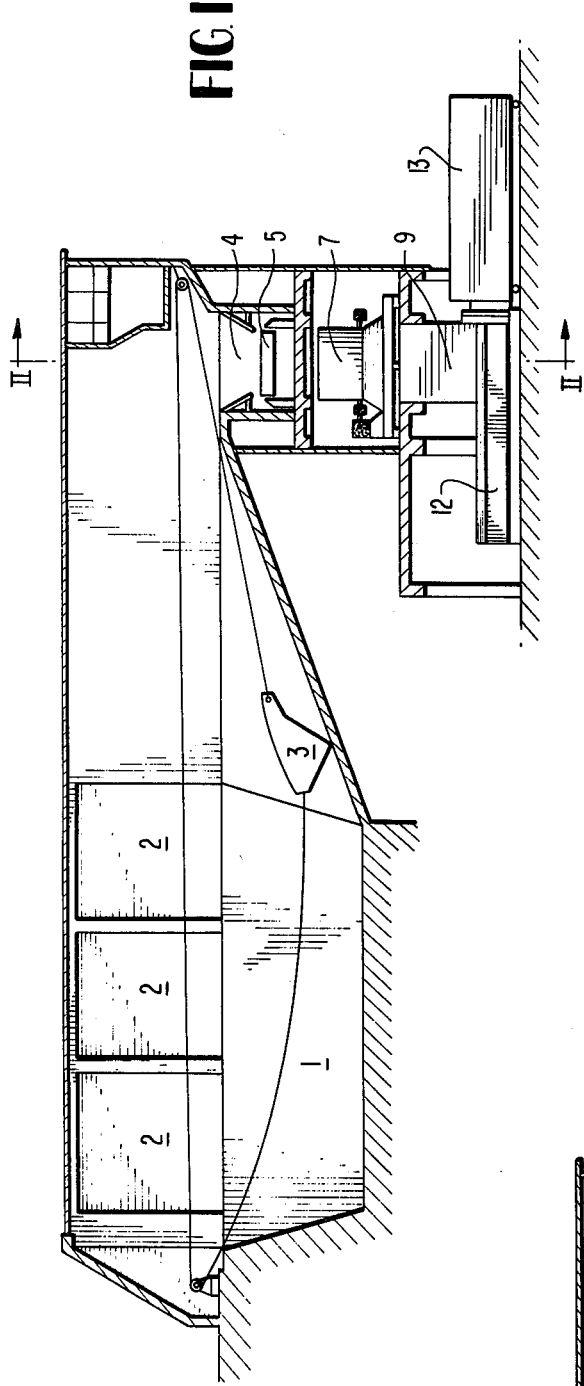
FIG. 1 is a schmatic longitudinal section of a plant for rubbish, as equipped according to the invention.

The plant for rubbish illustrated in the drawing includes a pit 1, into which the collecting trucks dump the rubbish through doors 2. The bucket of a drag line brings the rubbish to a first feed tank 4. The rubbish falls thus onto a feed vibro-conveyer 5, which dumps it into a second tank 6. The latter feeds a rubbish crusher 7, which is preferably carried by a shock absorbing frame, so as to compensate the horizontal stresses. The crusher 7 dumps the crushed rubbish into a double hopper 9, which has roughly an inverted Y section. In other words, the lower part of said hopper 9 ends in two spouts 10, 11. Spout 10 feeds a first compacting device 12 adapted to compress the rubbish horizontally into a container such as 13. The other spout 11 feeds a similar compacting device 14, disposed at the side of the compacting device 12 in order to fill other containers.

At the foot of the junction of the two spouts 10, 11, a transverse shaft 15 is provided, which is integral with the lower portion of a swinging flap 16. Said shaft 15 is adapted to turn on itself. One of its ends projects outside the spouts, and is actuated by a double-acting hydraulic jack 17. Stops 18 and 19 set the extreme positions of the distributing gate constituted by the flap 16.

Figure 2:
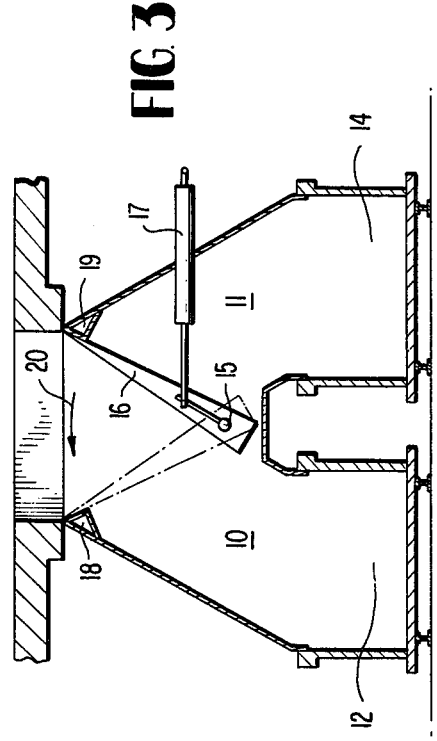
FIG. 2 is a section on line II—II of FIG. 1.
Figure 3:
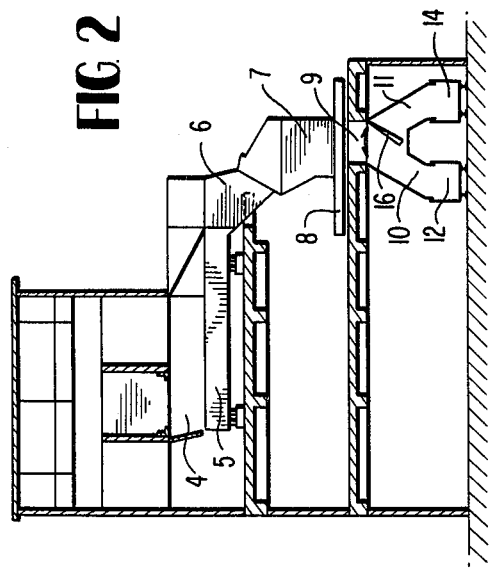
FIG. 3 shows, on a larger scale, a detail of FIG. 2.

The operation is as follows:

The drag line 3 works continuously, that is, it dumps rubbish into the first tank 4 without any idle time. When the flap 16 of the distributing gate is in the position shown in FIGS. 2 and 3, the rubbish is directed to the compacting device 12 which compresses it into the container 13.

When the container 13 is full, the vibro-conveyer 5 is stopped, but the dumping of the rubbish into the tank 4 goes on. The flow of rubbish is stopped for a short while at the level of the flap 16 which can then be swung in the direction of the arrow 20 by the action of the jack 17, after which the vibro-conveyer 5 is immediately re-started, and the rubbish is then directed through the spout 11 to the compacting device 14 in order to fill another container. Meanwhile, the operator can remove the full container 13 and replace it by an empty container.

I claim:

1. A plant for continuously compacting and crushing rubbish and placing the compacted rubbish in containers, comprising in combination,
    a. a receiving and storing tank to receive and store the rubbish from rubbish transport means,
    b. crushing means located adjacent said receiving tank,
    c. a continuously operating bucket attached to a drag line to move the rubbish from said receiving and storing tank to a horizontal vibrating conveyor which feeds the rubbish into said crushing means,
    d. a hopper having a single inlet and dual outlets located beneath said crushing means into which the rubbish passes after being crushed, said hopper having means to direct the rubbish to either of the dual outlets, and
    e. horizontal compacting means located beneath each outlet of said hopper to compact the crushed rubbish into a sealable container.

2. The rubbish compacting and crushing plant of claim 1 wherein the means to direct the rubbish to either of the dual hopper outlets comprises a hydraulically actuated flap pivotally attached to said hopper between the dual outlets.

* * * * *